United States Patent
Talukdar et al.

(10) Patent No.: US 7,466,651 B1
(45) Date of Patent: Dec. 16, 2008

(54) METHOD AND SYSTEM FOR RAPIDLY PRESENTING NETWORK-ELEMENT TRANSIENT DATA

(75) Inventors: Debashis Talukdar, Overland Park, KS (US); James Earl Goggans, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 904 days.

(21) Appl. No.: 10/791,967

(22) Filed: Mar. 3, 2004

(51) Int. Cl.
*H04J 3/16* (2006.01)
*G01R 31/08* (2006.01)
*H04L 12/28* (2006.01)
*G06F 15/16* (2006.01)

(52) U.S. Cl. ............... 370/230.1; 370/465; 370/412; 370/389; 709/227; 709/232

(58) Field of Classification Search ............ 709/231, 709/219, 218, 225, 203; 714/4, 724, 25, 714/33, 40; 370/242, 248, 249, 244, 250, 370/216, 252; 707/8, 102
See application file for complete search history.

(56) References Cited

U.S. PATENT DOCUMENTS

| | | | | |
|---|---|---|---|---|
| 6,138,163 | A * | 10/2000 | Nam et al. | 709/231 |
| 6,889,339 | B1 * | 5/2005 | D'Amico et al. | 714/4 |
| 6,894,980 | B1 * | 5/2005 | Pugaczewski et al. | 370/242 |
| 7,117,411 | B2 * | 10/2006 | McNeely et al. | 714/724 |

* cited by examiner

*Primary Examiner*—Hanh Nguyen
(74) *Attorney, Agent, or Firm*—Sonnenschein, Nath & Rosenthal LLC

(57) ABSTRACT

A method and system for preserving transient data of a telecommunications network element is provided. The method includes correctly sizing a communications buffer that will be used during a communications session with the network element. A communications session is established with the network element, and a set of data-request commands can be executed in batch without user intervention. Data sets are returned in response to the data-request commands, and the data sets are automatically parsed to produce an output file, which includes portions data from the information sets. The output file contains the data portions arranged in a format that is conducive to observation and analysis.

15 Claims, 12 Drawing Sheets

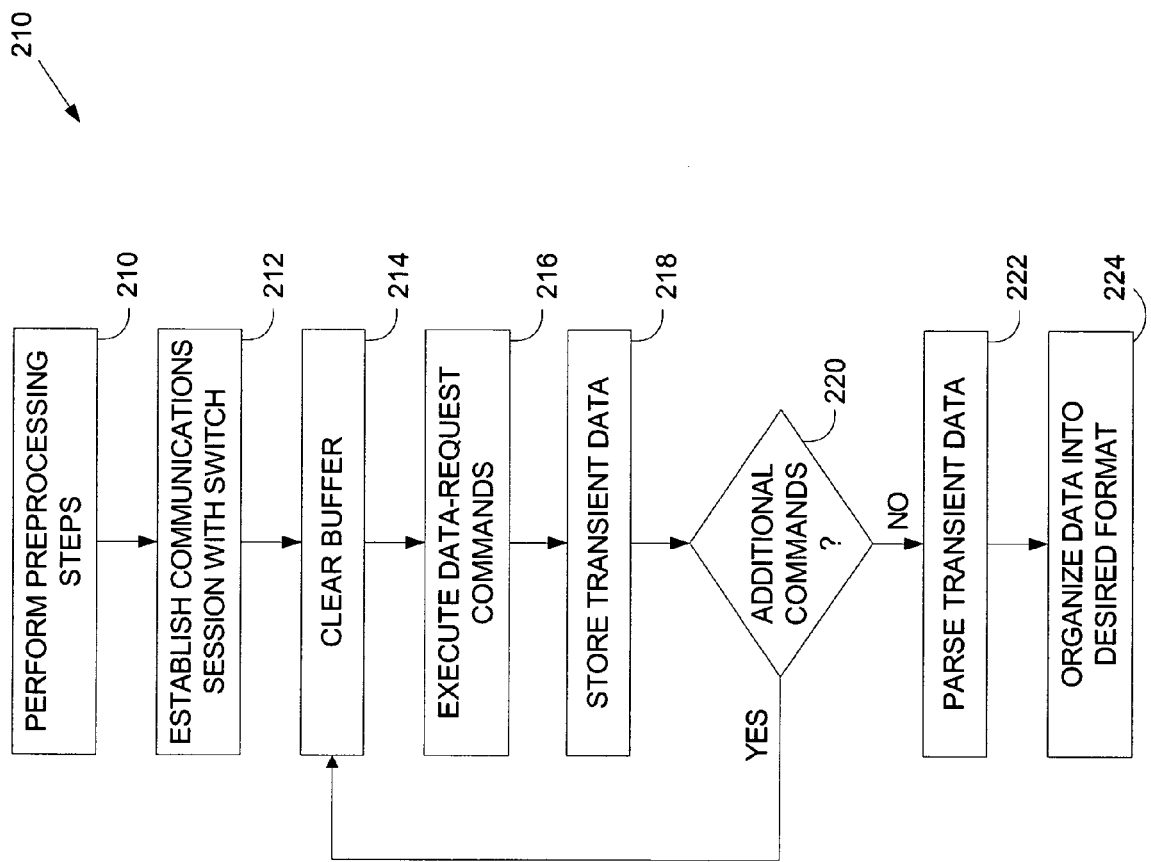

| CLLI | TGN | DIR | TRUNKS EQUIPPED | TRUNKS WORKING | INCATOT | INFAIL | NATTMPT | NOVFLATB | GLARE | OUTFAIL | TRU |
|---|---|---|---|---|---|---|---|---|---|---|---|
| DMS200G4X | | 448 | | | | | | | | | |
| SS7AFOCCPIPE | | | 2W 48 | 48 | 0 | 0 | 0 | 0 | 0 | | |
| DSAIT200 | | 239 | 2W 256 | 711 | 711 | 61 | 0 | 477 | 0 | 168 | 8 |
| VERIF 87 | | IC | 2W 1 | 1 | 0 | 0 | 0 | 0 | 0 | 0 | |
| ANA200 | | 257 | 2 | 2 | 0 | 0 | 4 | 0 | 0 | 0 | |
| OGTTOPS | | 67 | OG 9 | 9 | 0 | 0 | 0 | 0 | 0 | 0 | |
| DATOPS | | 246 | OG 26 | 26 | 0 | 103 | 0 | 72 | 0 | 0 | |
| BCFDS077IEPH | | | OG 8190 | 240 | 87 | 0 | 0 | 744 | 0 | 387 | 40 |
| 2W29364K | | 418 | 2W 24 | 24 | 0 | 0 | 0 | 0 | 0 | 0 | |
| LVUDS077IEPH | | | 2W 73 | 432 | 357 | 0 | 0 | 1176 | 0 | 292 | 97 |
| LVUDS077KEPH | | | 2W 97 | 48 | 0 | 0 | 0 | 24 | 0 | 0 | 0 |
| LVKDS077IEPH | | | 2W 111 | 404 | 553 | 0 | 0 | 1550 | 0 | 498 | 119 |
| 2W36764K | | 272 | 2W 48 | 48 | 0 | 96 | 0 | 0 | 0 | 0 | |
| LVBDS177KEAF | | | 2W 273 | 2014 | 2296 | 1 | 0 | 8184 | 0 | 3110 | 515 |
| E911M2 | | 427 | OG 3 | 3 | 0 | 0 | 0 | 0 | 0 | 0 | |
| LVRDS077IEPH | | | 2W 96 | 648 | 569 | 0 | 0 | 1750 | 0 | 569 | 122 |
| 2W45164K | | 274 | 2W 48 | 48 | 0 | 42 | 0 | 0 | 331 | 0 | |
| LVHDS077IEPH | | | 2W 72 | 168 | 142 | 0 | 0 | 406 | 0 | 114 | 49 |
| 2W45764K | | 275 | 2W 24 | 26 | 0 | 8 | 0 | 0 | 26 | 0 | |
| LVIDS077IEPH | | | 2W 244 | 120 | 87 | 0 | 0 | 357 | 0 | 83 | 25 |
| 2W45964K | | 419 | 2W 24 | 24 | 0 | 0 | 0 | 0 | 0 | 0 | |
| ESNM2 91 | | 2W | 3 | 3 | 0 | 0 | 0 | 0 | 0 | 0 | |
| VBNKM2 | | 108 | 2W 3 | 1 | 0 | 0 | 0 | 0 | 0 | 0 | |
| LVNPM2 | | 103 | OG 3 | 3 | 0 | 0 | 0 | 0 | 0 | 0 | |
| PALMESN | | 78 | 2W 3 | 3 | 0 | 0 | 0 | 0 | 0 | 0 | |
| CTHSM2 | | 106 | 2W 2 | 2 | 0 | 0 | 0 | 0 | 0 | 0 | |
| HNFDS077IEPH | | | 2W 569 | 263 | 363 | 0 | 27 | 1204 | 0 | 312 | 121 |
| 2W56464K | | 420 | 2W 24 | 24 | 0 | 0 | 0 | 0 | 0 | 124 | 31 |
| NLFDS077IEPH | | | 2W 238 | 144 | 80 | 0 | 0 | 365 | 0 | 0 | 0 |
| NLFDS177KEPH | | | 2W 199 | 24 | 0 | 0 | 0 | 27 | 0 | 100 | 35 |
| NLGDS077IEPH | | | 2W 261 | 96 | 75 | 0 | 0 | 217 | 0 | 0 | 0 |
| 2W64464K | | 422 | 2W 24 | 24 | 0 | 9 | 0 | 0 | 0 | 205 | 62 |
| LVUDS077IEPH | | | 2W 77 | 168 | 189 | 0 | 0 | 795 | 0 | 0 | 0 |
| 2W64564K | | 276 | 2W 24 | 24 | 0 | 0 | 0 | 0 | 0 | 120 | 38 |
| LVTDS077IEPH | | | 2W 79 | 168 | 85 | 0 | 0 | 321 | 0 | 0 | 0 |
| 2W64664K | | 281 | 2W 24 | 24 | 0 | 9 | 0 | 0 | 0 | 431 | 126 |
| LVGDS077IEPH | | | 2W 71 | 276 | 512 | 0 | 0 | 1153 | 0 | 0 | 0 |
| 2W73564K | | 405 | 2W 48 | 48 | 0 | 180 | 0 | 0 | 0 | | |

METHOD AND SYSTEM FOR RAPIDLY PRESENTING NETWORK-ELEMENT TRANSIENT DATA

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of resolving problems in a communications network. More particularly, the present invention is related to determining how to automatically access, receive, and store data from network elements that would otherwise be periodically expunged.

BACKGROUND OF THE INVENTION

A telecommunications network includes a litany of network elements, including switches and switching components. Switches help complete a circuit between two communications entities, such as between two persons to make a phone call or between two modems to communicate data. A switch directs traffic and completes circuits by referencing data stored in tables. These switch tables contain routing information as well as a variety of other data items that will be discussed in greater detail below. Exemplary data items, such as operational measurements, include a count of incoming calls, incoming call attempts, and overflows, instances of glare and much more. This data, however, is not stagnant.

At certain intervals, storage within a switch allocated to transient data is exhausted. Transient data is data that is periodically expunged to make room for new data. Thus, every thirty minutes for example, a rollover of accumulated traffic data occurs. The data to be expunged, however, can be valuable if a network problem occurs. Currently, there is no system nor method available to harness this data and make it immediately available incident to desired intervals (such as every half hour or so).

The aforementioned problem would be somewhat akin to having an envelope that could hold only a certain number of receipts, and individual receipts could not be removed. A consumer would thus have to empty the envelope after storing a threshold amount of receipts, thereby losing old receipts and their corresponding value should a respective item break and need to be returned. The current state of the art allows for data archival, such data is unavailable until the next day.

Unlike the retail world where waiting an extra day may not translate to a significant problem, in the telecommunications industry, seconds count. When a person wants to place a telephone call, but does not receive a dial tone, the problem is expected to be remedied with a handset-button press. Imagine the frustration of having to wait until the next day to place your call. Such a scheme is unacceptable and even dangerous—"911" and other emergency calls must be able to be processed quickly and reliably. Communications carriers have strived to maintain a high level of service at great expense and by expending considerable resources. But as data-communication demands rapidly expand, historical methods of dealing with the problems associated with iteratively losing temporarily stored data will not be adequate.

Absent the present invention, analysts were often made aware of problems by their own customers, who were experiencing an interruption in service—no dial tone, busy signals, misrouted calls, unclear service, loss of data packets, and more. To be firstly made aware of a problem by justly complaining customers is the bane of a company, especially a communications company, which is expected to deliver substantially uninterrupted service. After realizing a problem exists, analysts might attempt to gather information from the device, such as a switch, servicing the customers. As previously stated, historical data is not available until the next day.

But even in situations where analysts try to work rapidly to gather information from transient data before that data is expunged, what little information that is retrieved is in a format that is difficult to understand. Several time-consuming processes must be followed to return even a little data. These processes physically limit the amount of information that can be gathered prior to losing data.

In some, even many, situations, analysts must wait until the next day to resolve the problem. During the interim, efforts are made to reroute traffic. But even rerouting traffic is difficult because to reroute traffic, one must identify the problem device from which traffic should be rerouted. If temporary bandwidth is available, overkill techniques can be temporarily employed to reroute as much data as possible. Such a technique is risky, however, because if still another fault occurs, limited bandwidth remains with which to help resolve the additional problem. Even when the data is made available after a lengthy waiting period (such as the next day), it is in a confusing format that does not lend itself to quick analysis.

To illustrate an exemplary hard-to-read format, consider the data returned from an OmShow command issued to an illustrative switch, such as the DMS100 offered by the Nortel Networks Corporation of Brampton, Ontario, in Canada. An OmShow command returns certain data parameters of a switch. Table I provides an exemplary format of data returned to a screen or printer incident to issuing an OmShow command ("omshow trk active DMS20064K") to a switch for the trunk group "DMS20064K."

TABLE I

Prior-Art Data Format

```
>omshow trk active DMS20064K
TRK
CLASS: ACTIVE
START: 2003/10/10 10:00:00 FRI; STOP: 2003/10/10 10:11:40 FRI;
SLOWSAMPLES:       7 ; FASTSAMPLES:        70 ;
    KEY (COMMON_LANGUAGE_NAME)
    INFO (OM2TRKINFO)
        INCATOT    PRERTEAB    INFAIL   NATTMPT
        NOVFLATB      GLARE   OUTFAIL   DEFLDCA
            DREU       PREU       TRU       SBU
             MBU   OUTMTCHF   CONNECT    TANDEM
             AOF        ANF      TOTU    ANSWER
         ACCCONG   NOANSWER  INANSWER   OUTANSU
          INANSU
    448 DMS20064K
  2W      48      48
                   0           0         0         0
                   0           0         0         0
                   0           0         8         0
                   0           0         0         0
                   0           0         8         0
                   0           0         0         0
                   0
```

The data of Table I is relatively difficult to read. A person must be trained how to read the data. The trained person then must persevere the technical constraints of a monitor, which may lack a scroll function to view all the data at one time. From Table I begins with the actual OmShow command ("omshow trk active DMS20064K"), and ends with a matrix of numerals that relate to a corresponding matrix of labels. For instance, "INCATOT," (incoming attempts total) corresponds to the upper left "0." To determine what value corresponds to "CONNECT," an analyst would need to determine the label's position in the upper matrix and then locate the data value in the same position of the lower matrix, which would also be "0," vertically sandwiched between two "8's." This tedious approach is compounded as fatigue sets in from analyzing display after display. Moreover, the data in Table I corresponds to a mere single OmShow request for only a singly trunk group.

In practice, several tens and maybe even hundreds of OmShow requests may need to be initiated to troubleshoot a problem element. All of the data from each OmShow request must then be tediously analyzed. Opportunities for human error abound, which could plague the troubleshooting process with a garbage-in/garbage-out analysis.

To summarize, the current state of the art suffers from a variety of shortcomings, not limited to the following. Prior-art techniques do not permit a carrier to effectively troubleshoot problems in a communications network where transient data is needed. No immediate notification of problems is available until at least the next day. Problems that arise could include call blocking, dropped calls, and more and are often discovered in reaction to customer complaints, which makes problem resolution reactive instead of proactive. A carrier cannot see a build-up of traffic and cannot effectively reroute affected data traffic. Without access to operational-measurement data is akin to trying to identify the source of a problem is analogous to looking for a proverbial needle in a haystack.

The state of the art could be improved by providing a system and method of identifying problems in a communications network by preserving transient data, such as operational-measurement data, and providing a way to automatically retrieve the data, store it, and format the data so it can be easily analyzed.

SUMMARY OF THE INVENTION

The present invention solves at least the above problems by providing a method and system for troubleshooting a communications network by making available transient switch data, automatically retrieving the data, storing it, and quickly formatting it in such a way that it can be used for analysis. The present invention has several practical applications in the technical arts, not limited to decreasing network-troubleshooting time, making transient data immediately available, and depicting the data in a graphical format. This allows problems to be more quickly identified, and hence remedied. Data is returned in a format that is conducive to being analyzed in aggregate. That is, the information returned from multiple commands, such as from multiple OmShow commands, is collectively presented for analysis to a user. The present invention allows an analyst to glean the data from approximately one hundred OmShow requests in the time historically associated with submitting only three requests.

Still further, this data can be automatically analyzed to identify network problems. The present invention can also be used in a test setting—to observe how data traffic will flow incident to implementing a new network component, such as a switch or a router. Specific routing, such as that related to "1-800" calls can be rerouted to tandems. The rerouting can be monitored to prevent overloading carrier trunk groups.

In a first aspect, the present invention includes a method for preserving transient data of a telecommunications switch. The method includes increasing the size of a communications buffer that will be used in establishing a communications link with the switch to a predetermined buffer size. A communications link with the switch is established, and a set of data-request commands are submitted to the switch. Information sets are received in response to submitting the data-request commands, and the present invention automatically parses the of information sets to produce an output file that includes at least a portions data from the information sets. The portion of data is arranged in a format that is easy to read and understand.

In a second aspect, one or more computer-readable media are provided that contain computer-useable instructions for performing a method of troubleshooting a communications network. The method includes establishing a communications link with a network element, referencing an input file that includes a set of data-request commands, automatically executing the plurality of data-request commands at the network element, generating an intermediary file that includes raw data returned by the data-request commands, and, without user intervention, generating an immediately accessible output file that includes all or a portion of the raw data in a prescribed format.

In a third aspect, a computer-implemented method for troubleshooting a communications network is provided. The method includes manipulating a size of a communications buffer that will be used to receive data from a network element, automatically retrieving transient data from the network element by issuing a plurality of data-request commands, and storing the transient data in a format having a plurality of rows, each of the plurality of rows corresponds to a data set returned from a respective data-request command.

In a fourth aspect, a system for identifying problems in a communications network is provided. The system includes one or more memory components and a set of computer-useable instructions to be received by the memory components that, when executed: establish a communications link with a network element, extract transient data from the network element, and formats the extracted data according to a predefined format.

In a final illustrative aspect, a computer-implemented method for preserving temporary data of a network element in a communications network is provided. The method includes providing a set of data-request commands that will successively extract data sets from the network element, sizing a buffer to be used to receive the successively extracted data sets to a value equal to approximately 1 Mb per data-request command, establishing a communications link with the network element, submitting the plurality of data-request commands in batch, receiving the data sets, and formatting the data sets in a matrix. Operational variances may permit a smaller buffer size on the order of hundreds of kilobytes, and generating a graphical representation of the data sets

BRIEF DESCRIPTION OF THE SEVERAL VIEWS OF THE DRAWINGS

The present invention is described in detail below with reference to the attached drawing figures, which are incorporated by reference herein and wherein:

FIG. 2 is a flowchart illustrating an exemplary method for practicing the present invention in accordance with an embodiment of the present invention;

FIG. 3 is a screenshot of an output file illustratively formatted in accordance with an embodiment of the present invention;

FIG. 4 is a screenshot of the output file of FIG. 3 imported into a conventional spreadsheet program;

DETAILED DESCRIPTION OF THE INVENTION

Figure 1A:
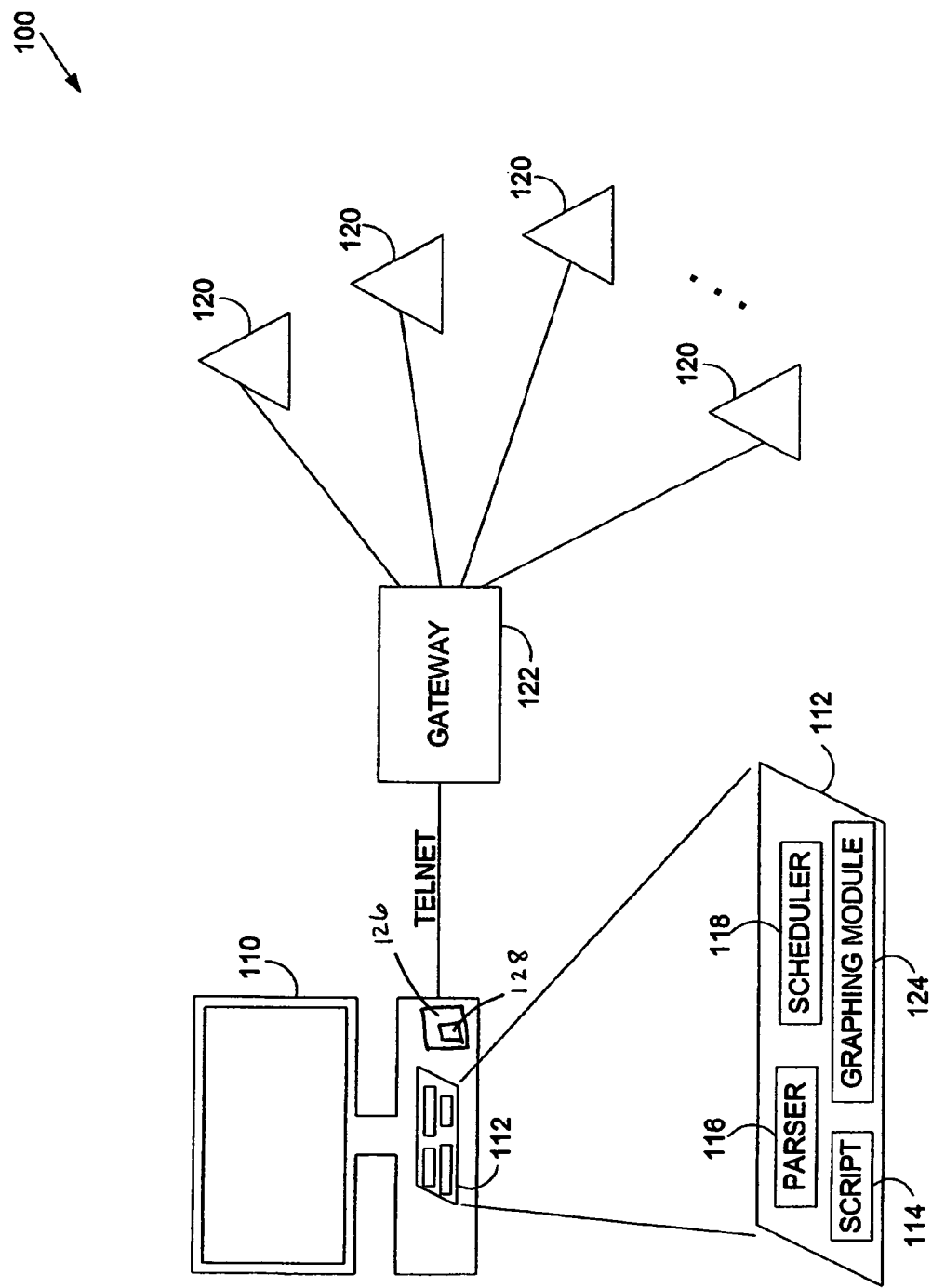
FIG. 1A depicts an exemplary operating environment suitable for practicing an embodiment of the present invention.

The present invention provides a method and system for maintaining proper dataflow in a communications network and troubleshooting problems associated with the same. Transient data must be periodically expunged from network elements to make room for more data, but the to-be expunged data is useful for troubleshooting purposes. The present invention preserves this data and formats it for swift analysis.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, gateways, workstations, and other machines may be connected to one another across a communication medium including, for example, a network or networks.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CLLI | Common Language Location Identification |
| IP | Internet Protocol |
| RAMPS | A type of gateway |
| TRK | Trunk or Trunk Group |
| VPN | Virtual Private Network |

Further, various technical terms are used throughout this description. A definition of such terms can be found in Newton's Telecom Dictionary by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed by the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, a preferred embodiment will now be referenced in connection with a communications network. FIG. 1 illustrates an exemplary operating environment suitable for practicing the present invention and is referenced generally by the numeral 100. Operating environment 100 should not be construed as a limitation of the present invention. Additional components that can be used in connection with the present invention are not shown so as to not obscure the present invention.

Operating environment 100 includes a computer 110 upon which runs an application 112 and a graphing module 124. Application 112 includes a parser 114, a script 116, and a scheduler module 118. Computer 110 is coupled to a plurality of network elements, such as switches 120. In the illustrative embodiment shown, an intermediary gateway 122 helps facilitate communication between computer 110 and one or more switches 120. In a preferred embodiment, communication between computer 110 and switch 120 is provided by a telnet session, as indicated in FIG. 1. Computer 110 may communicate with a switch 120 through a variety of technologies, and such communication mode should not be construed as limited to a telnet session. A telnet session is merely one example of a communications scheme between computer 110 and switches 120. Additional communications schemes include remote-access technologies, Virtual Private Network (VPN) technologies, and the like.

Computer 110 can be a conventional computer (gateway, laptop, workstation, etc.) that includes one or more memory components, a processor, and a variety of input/output components that enable it to interact with various peripheral devices. Low-level detail of these various components are not provided due to their conventional nature.

Application 112 provides various functional aspects of the present invention and runs on computer 110 in one embodiment. Although application 112 is shown composed of three modules, such a depiction is presented to facilitate explaining the present invention with reference to various functional aspects. Application 112 may be composed of fewer or additional modules, so long as the functionality described herein is offered. To ease explanation, application 112 will be referenced to include script 114, parser 116, and scheduler 118.

Script 114, which will be explained in greater detail below, provides for the automatic execution of multiple data-request commands and manages data received from those commands. Parser 116 parses raw data returned from the various data-request commands into a format conducive for analysis. Scheduler 118 automatically launches routines, including command-line routines, at scheduled times automatically.

As previously mentioned, certain types of transient data (such as operational-measurement data) is periodically expunged from switch 120 to make room for new data. Operational-measurement data, however, can be very useful in troubleshooting network problems as they arise. Accordingly, the unavailability of operational-measurement data greatly prolongs the process of identifying network problems and consequently resolving them. Exemplary operational-measurement data includes, but is not limited to: usage data related to one or more trunk groups, a count of incoming calls, an indication of call volume, a count of incoming-call attempts, a count of call overflows, a count of glare instances, a count of trunks operating, a count of incoming call failures, an indication of data capacity, a count of outbound failures, and traffic-flow metrics.

Even when the data is extracted, it has historically been presented to a user in a cryptic format, such as that depicted below in Table II.

TABLE II

Prior-Art Data Format - Multiple Returns omshow trk active SS7AFOCCPIPE
TRK
CLASS: ACTIVE
START: 2003/10/10 10:00:00 FRI; STOP: 2003/10/10 10:11:45 FRI;
SLOWSAMPLES:         8 ; FASTSAMPLES:         71 ;
    KEY (COMMON_LANGUAGE_NANE)
    INFO (OM2TRKINFO)
        INCATOT     PRERTEAB    INFAIL      NATTMPT
        NOVFLATB    GLARE       OUTFAIL     DEFLDCA
        DREU        PREU        TRU         SBU
        MBU         OUTMTCHF    CONNECT     TANDEM
        AOF         ANF         TOTU        ANSWER
        ACCCONG     NOANSWER    INANSWER    OUTANSU
        INANSU
    256 SS7AFOCCPIPE
    2W      711     711
                    61          0           0           168
                    0           0           0           0
                    0           0           477         0
                    0           0           168         8
                    0           0           477         156
                    0           0           0           0
                    0
>omshow trk active DSAIT200
TRK
CLASS: ACTIVE
START: 2003/10/10 10:00:00 FRI; STOP: 2003/10/10 10:11:50 FRI;
SLOWSAMPLES:         8 ; FASTSAMPLES:         71 ;
    KEY (COMMON_LANGUAGE_NAME)

TABLE II-continued

Prior-Art Data Format - Multiple Returns

INFO (OM2TRKINFO)
        INCATOT     PRERTEAB    INFAIL      NATTMPT
        NOVFLATB    GLARE       OUTFAIL     DEFLDCA
        DREU        PREU        TRU         SBU
        MBU         OUTMTCHF    CONNECT     TANDEM
        AOF         ANF         TOTU        ANSWER
        ACCCONG     NOANSWER    INANSWER    OUTANSU
        INANSU
    239 DSAIT200
    2W      1       1
                    0           0           0           0
                    0           0           0           0
                    0           0           0           0
                    0           0           0           0
                    0           0           0           0
                    0           0           0           0
                    0

Table II illustrates the serial return of data incident to issuing only two OmShow requests. The first OmShow request ("OmShow TRK active SS7AFOCCPIPE") yields two matrices of data: an upper matrix that includes four columns of labels and a lower matrix that includes four columns of numbers. The second OmShow request ("OmShow TRK active DSAIT200") also yields two matrices of data similar to that of the first OmShow request.

Historically, even receiving this data in a cryptic format has been a time-consuming process. Operational-measurement data is commonly rolled over on the order of every twenty or thirty minutes, which does not allow a substantial amount of time to issue multiple OmShow requests. Table II illustrates the data returned from a mere two OmShow requests. To troubleshoot a network, however, an analyst may need to submit several tens or even more than a hundred OmShow requests just to receive the data necessary to troubleshoot a particular problem. Accordingly, output to a screen or a printer for one hundred OmShow requests would consume fifty times as much space as is depicted in Table II above. Manually combing though such data is an arduous task. The present invention includes a method for both providing such data and formatting the data to a form that is conducive to analysis to ultimately resolve a problem in a communications network.

Figure 1B:
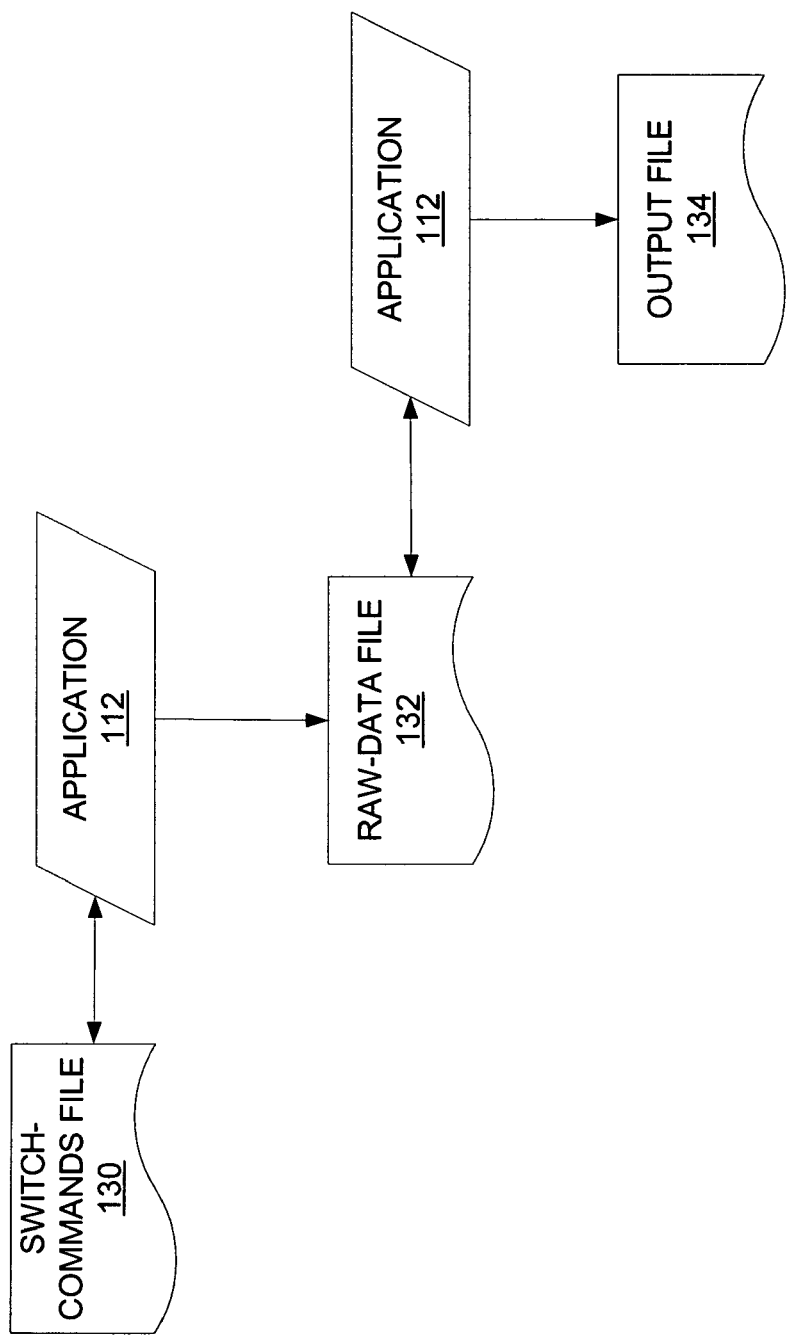
FIG. 1B depicts an exemplary data flow and file references employed in accordance with an embodiment of the present invention.

FIG. 1B is a data flow diagram that illustrates how one embodiment of how data flows in the present invention. A switch-commands file 130 stores multiple commands to be executed on a network element. For example, switch-commands file 130 may include multiple OmShow commands to be executed at a switch, such as switch 120. Although termed herein "switch-commands file 130," it is to be understood that such a file could store commands to be run on devices other than a switch. Application 112 references switch-commands file 130 to produce a raw-data file 132. In one embodiment, raw-data file 132 is composed of several data returns similar to the one depicted in Table I and the two depicted in Table II. Raw-data file 132 is referenced by application 112 to produce an output file 134, which is nicely formatted and conducive to analysis.

Turning now to FIG. 2, an exemplary method in accordance with one embodiment of the present invention is referenced generally by the numeral 200. The order of the steps shown should not be construed as mandatory and those skilled in the art will appreciate that certain intermediary steps are not shown. These steps are not shown so as to not obscure the present invention. At a step 210, application 112 performs any necessary preprocessing steps. In a preferred embodiment, various connection parameters are initially defined. Such parameters include a RAMPS_GATEWAY_IP, a RAMPS_GATEWAY_USER_ID, a RAMPS_GATEWAY_PASSWORD, a SWITCH_SERIAL NUMBER, a SWITCH_USER_ID, a SWITCH_PASSWORD, and a SWITCH_CLLI_NAME. As previously mentioned, the preferred embodiment includes using an intermediary gateway, such as a RAMPS gateway, to facilitate communication between computer 110 and switch 120. Employing such an intermediary gateway 122, however, is not required.

Additional variables such as a maximum buffer size and capture-file name (to name raw-data file 132) are also preferably initialized during step 210. With a data-rollover rate of approximately once every twenty to thirty minutes, multiple raw-data files 132 will need to be generated. Each of these different multiple raw-data files 132 are preferably uniquely named. Thus, in one embodiment, the raw-data files 132 are named according to the time at which they are created. In a preferred embodiment, a descriptive file name is coupled to a label that corresponds to a time indicator based on when raw-data file 132 is created.

At a step 212, application 112 establishes a communication session with a desired switch 120, providing any requisite switch ID, user ID, or password information associated with logging into a switch 120 via gateway 122. In a preferred embodiment, a telnet session facilitates communication between computer 110 and switch 120. Determining how to provide a communication session presented an obstacle to the solution ultimately disclosed herein. When attempting to automatically receive the potentially large amount of transient data from switch 120, the results obtained did not correspond to the correct data that resided within switch 120. Ultimately, the particular problem associated with bad results was identified as a buffering limitation associated with facilitating a telnet session using IP (internet protocol) or a variation of the same.

A buffer is used in establishing a telnet session. A buffer is a temporary area in memory that can eventually fill up. Data sent from a remote device, such as switch 120, must be properly received by computer 110. However, situations arise where data is sent from switch 120 but cannot immediately be processed by computer 110. In such situations, the data is allocated to a respective buffer. If the buffer is too small, data is garbled, and junk data is consequently outputted. Applicants determined that the telnet buffer was too small, and increased its size to a value that, worse case, would not require successive clearing. A buffer size of 640 megabytes proved to be adequate. But a buffer size of one megabyte per ten data-request commands (such as OnShow requests) is also acceptable. These values should not be construed as invariable and absolute. What is more important is that the problems associated with the buffer limitation were identified as an obstacle to solution disclosed herein. Additionally, commands are issued by application 112 to periodically clear the buffer to further ensure that it will not overflow. These two nonobvious solutions to a strategically identified problem allow all of the transient data from switch 120 to be received and processed correctly.

At a step 214, script 114 clears the telnet buffer(s). Script 114 then begins to execute the data-request commands in switch-commands file 130 at a step 216. In a preferred embodiment, the list of switch commands are stored in switch-commands file 130 that is referenced by script 114. For example, switch-commands file 130 may include one hundred or more OmShow commands, which can be executed in batch by script 114. The present invention has the ability to perform approximately one hundred OmShow requests and return their corresponding data in the time it has historically taken to process only three OmShow requests.

To execute the data-request commands according to a preferred embodiment, each command is referenced in switch-commands file 130. A switch (or other element) command is processed, and the respective transient data is stored at a step 218, preferably in raw-data file 132. A determination is made at a step 220 as to whether additional data-request commands are present in switch-commands file 130. If so, processing reverts to step 214, the telnet buffer is again cleared, and the next data-request command is executed. Its respective data is received and stored at step 218. This loop continues for each data-request in the switch-commands file 130. After all data-request commands are executed, any log-off commands necessary to gracefully log off gateway 122 are preferably processed.

At a step 222, parser 116 parses the transient data embodied in the raw-data file 132. The transient data can be parsed in a litany of ways. An exemplary method for parsing the transient data follows, but should not be construed as a limitation of the present invention. In a preferred embodiment, input and output file objects are created, which respectively refer to raw-data file 132 and output file 134, which may include a spreadsheet file.

A first row is generated in output file 134 to label column headings. Raw-data file 132 then begins to be processed. The present invention preferably employees a method for recognizing patterns within raw-data file 132. For instance, parser 116 may search for the line that includes "INCATOT PRE-RTEAB INFAIL NATTMPT," which appears in Table I and Table II. After finding a specific pattern, parser 116 can skip a predetermined number of lines to gather additional data, such as the trunk group number and trunk group CLLI code. With reference to Table I in the background section above, the trunk group number is "448" and the trunk group CLLI code is "DMS20064K."

Parser 116 then preferably advances to the next line ("2W 48 48"). From this line, illustratively depicted in Table I, the direction number, number of trunks equipped, and number of working trunks can be gleaned. Parser 116 can then advance to the next line and begin processing the lower matrix, composed of four columns of numerals. If the raw data in file 132 was formatted differently, then alternative patterns would be searched for.

Based on their position, any data that corresponds to the labels of the upper matrix can be parsed. For example, if the numeral corresponding to "INCATOT" is desired, parser 116 can associate a respective variable with the most upper left numeral, which in this case is a "0" and positionally corresponds to "INCATOT." If the numeral associated with "INFAIL" is desired, then a second variable can be associated with the third number in the first row of the lower matrix in Table I. Similar techniques can be employed to obtain as much data as is desired.

In a preferred embodiment, each set of output data is processed to generate a single row of data in output file 134. After the data items associated with the desired labels are associated with as many variables as are necessary to generate a single row in output file 134, the values are actually sent to output file 134. Writing one row at a time allows the data to be organized at a step 224. It is to be understood that rows of data need not necessarily be iteratively generated. What is more important is that output file 134 is composed of logically arranged data.

Figure 4:
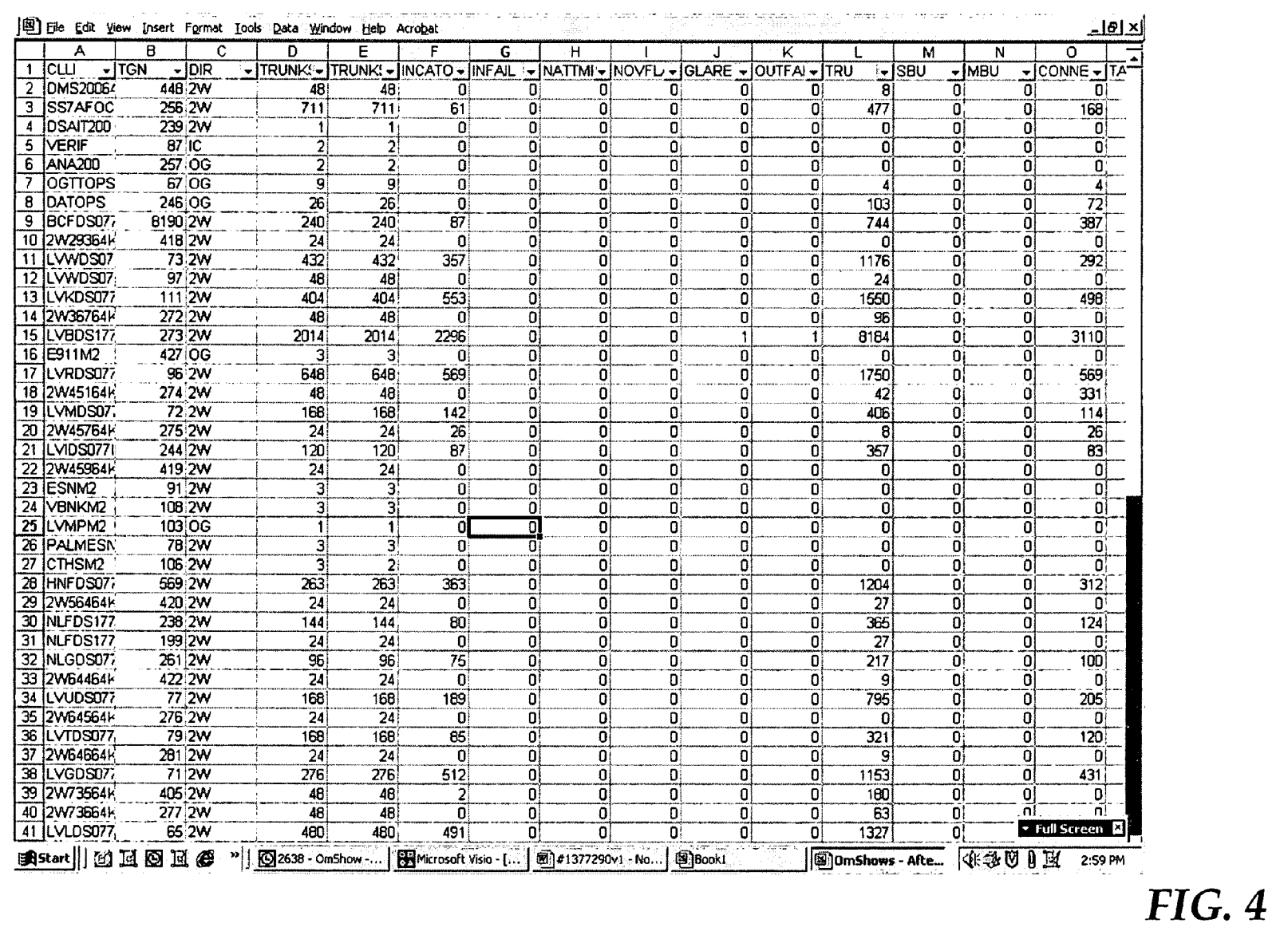

When written to output file 134, data is specifically placed in specific locations to create an easy-to-read format that is also easily received by additional applications. A depiction of an exemplary output file 134 is presented in FIG. 3. Output file 134 is in a format that is conducive to analysis that will lead to identification of a particular problem (and its resolution) present in a communications network. Output file 134 can be analyzed directly or imported into a spreadsheet program such as Excel® produced by the Microsoft Corporation of Redmond Wash. FIG. 4 illustrates such spreadsheet file created from importing output file 134. As depicted by the arrows in the first row, the data in output file 134 can be easily filtered, sorted, or otherwise manipulated to identify problems in a communications network.

Figure 6A:
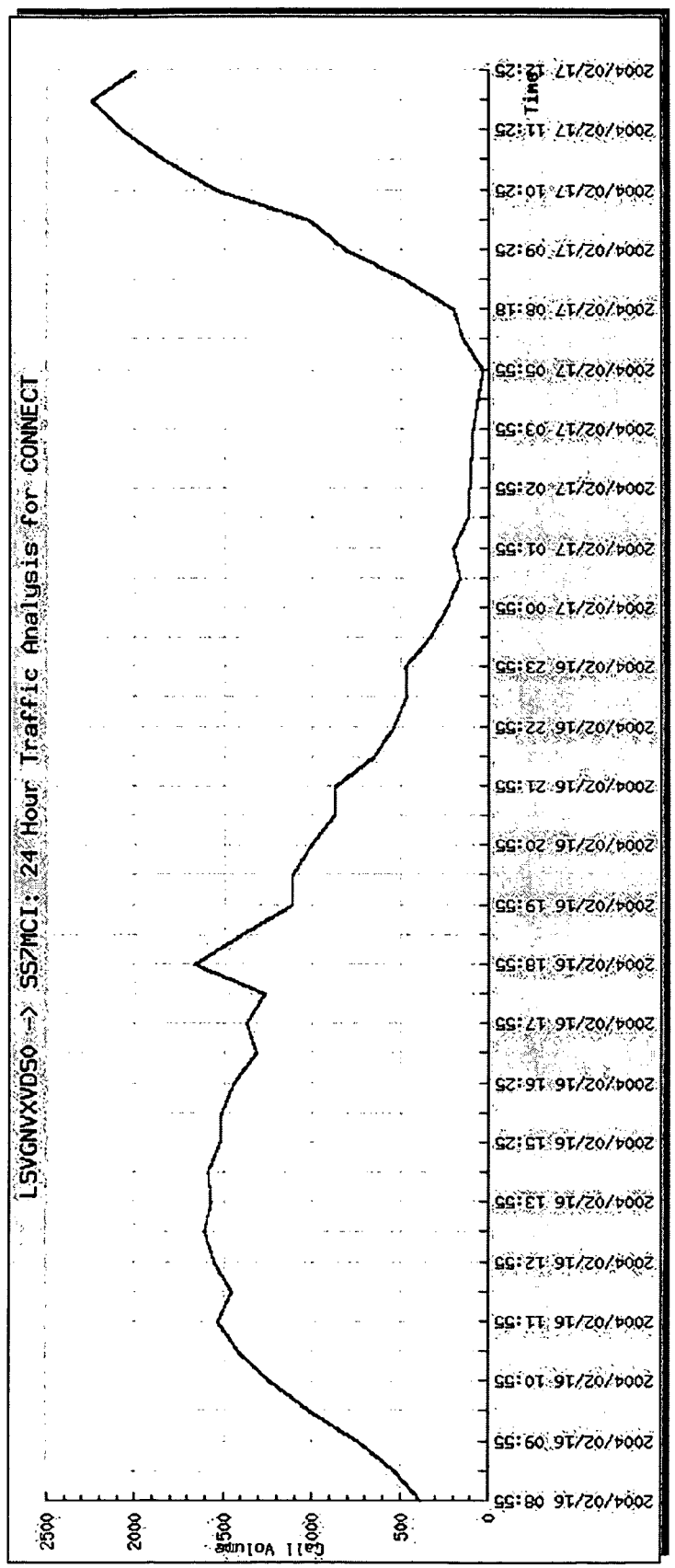
FIGS. 6A-6F are selected screenshots of actual graphs produced by the graphing module of FIG. 5 and depict all or a portion of the data associated with the output file of FIG. 3.

Not limited to a mere textual presentation, the formatted output file can also be depicted graphically. FIG. 6A depicts a column chart of trunk analysis. The column headings depicted in

TABLE III

Column Headings of Output File

| Heading Abbreviation | Meaning |
| --- | --- |
| CLLI | Common Language Location Identification |
| TGN | Trunk Group Number |
| DIR | Direction |
| Trunks Equipped | Trunks Equipped |
| Trunks Working | Trunks Working |
| INCATOT | Incoming Totals |
| INFAIL | Incoming Failures |
| NATTMPT | Number of Attempts to seize a trunk of a trunk group |
| NOVFLATB | Number of overflows when All Trunks were Busy |
| GLARE | Instances where more than one user attempts to seize the same trunk. |
| OUTFAIL | The number of attempts to seize and Outgoing Trunk in a Trunk Group that FAIL due to signaling problems, Outgoing Failures, Loss of Accuracy or Seizure Failures |
| TRU | Count of Processing Busy Trunks |
| SBU | Count of System Busy Trunks |
| MBU | Count of Manual Busy Trunks |
| CONNECT | Count of Outgoing seizure attempts for a successful connection |
| TANDEM | Count of the number of Incoming Calls on a trunk group that first route to an Outgoing Trunk Group |
| CAPACITY | The total percent usage of the trunk group in a given period of time (See FIG. 6D) |

Figure 5:
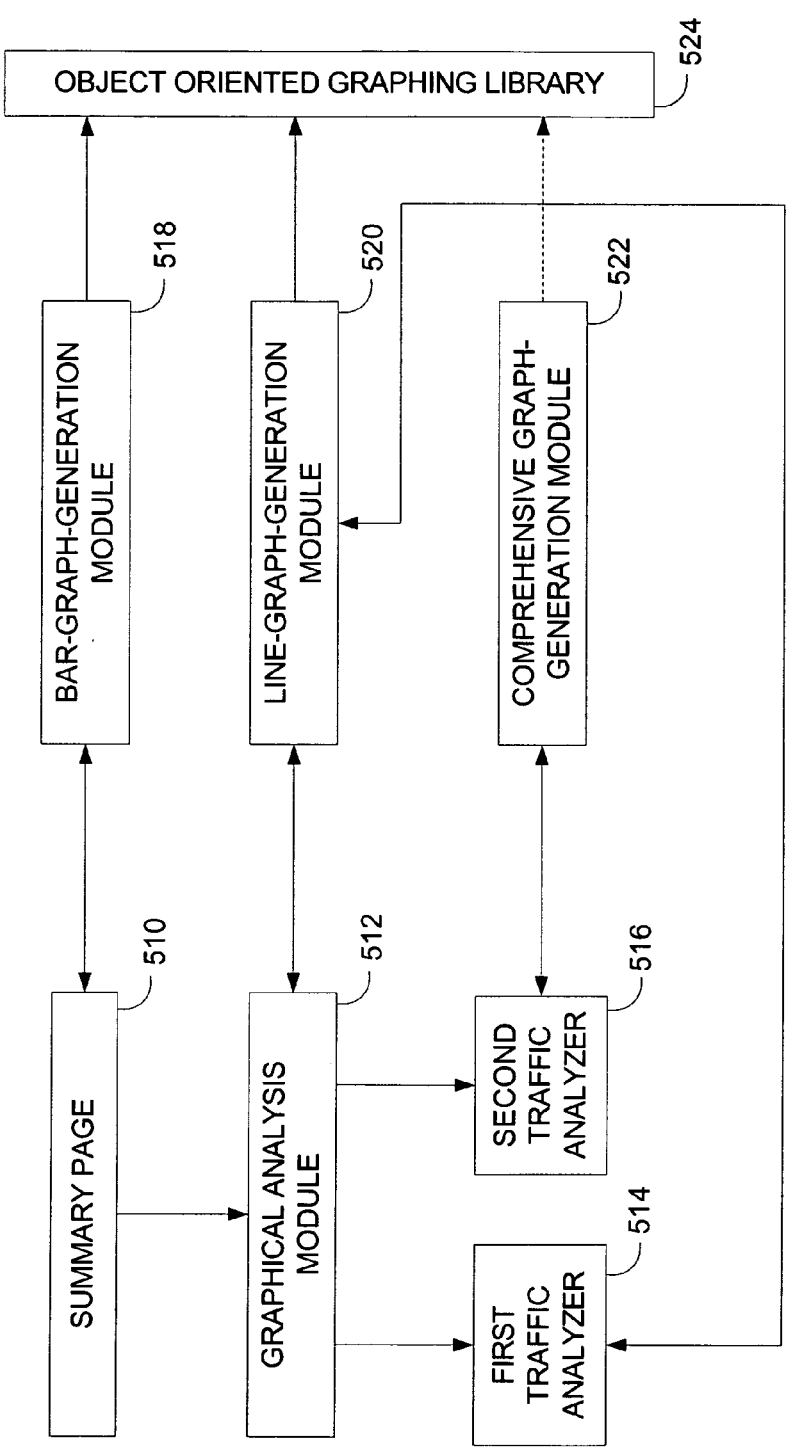
FIG. 5 is a block diagram depicting a graphics engine suitable for use in an embodiment of the present invention.

Turning now to FIG. 5, graphing module 124 is shown in greater detail. In a preferred embodiment, graphing module 124 takes the form of an Internet application that includes a summary page 510, a graphical-analysis page 512, a first traffic analyzer 514, a second traffic analyzer 516, a bar-graph-generation module 518, a line-graph-generation module 520, a comprehensive graph-generation module 522, and an object oriented graphing library 524.

An instance of summary page 510 can appear for each switch. It preferably displays results for the most recent query in a tabular format highlighting each trunk group undergoing overflows. Summary page 510 also displays a bar graph for each of the trunk groups polled as well as their capacities. Further still, it provides links to reports related to each individual trunk group.

Figure 6B:
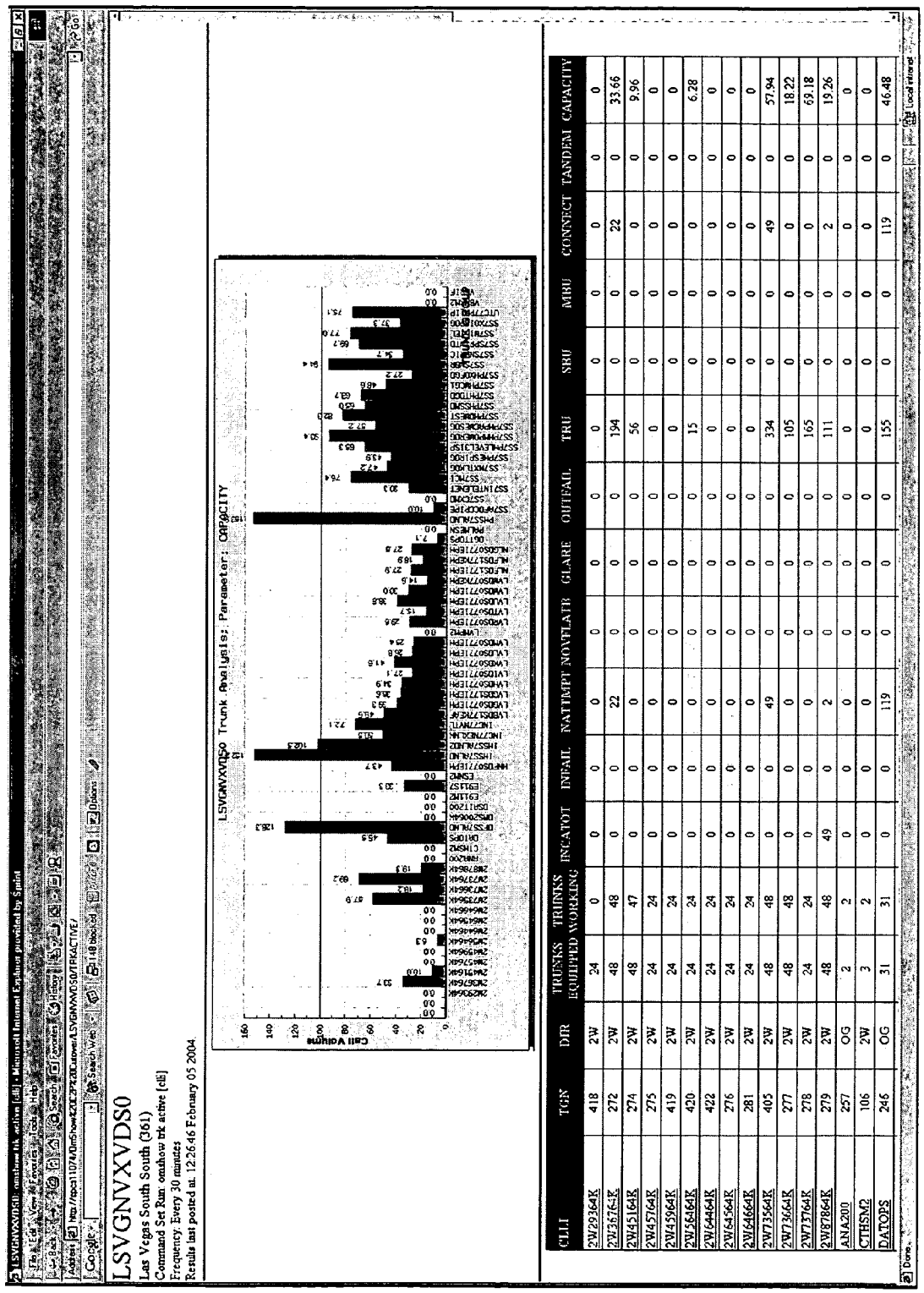
Figure 6C:
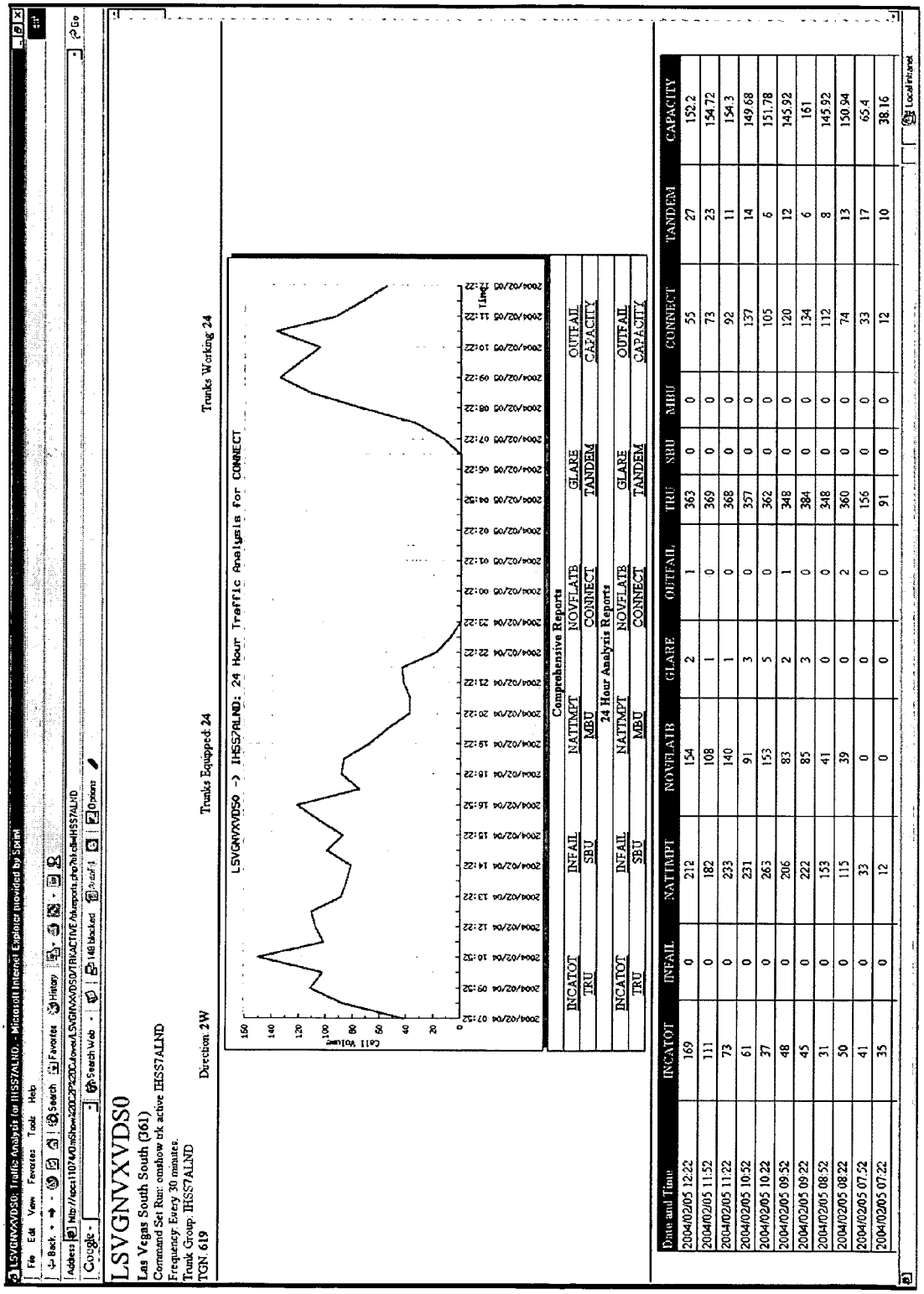

Graph analysis module 512 accepts a trunk group as a parameter and parses the comprehensive data log collected for all measurements related to the trunk group. It then displays a comprehensive report for each trunk group. Graph analysis module 512 also displays a connect line graph for a desired period, such as the last 24 hours, and provides links to individual reports—both comprehensive and over a desired duration—for each parameter. An exemplary connect line graph is provided in FIG. 6A. Other exemplary track reports are provided in FIGS. 6B and 6C.

Figure 6D:
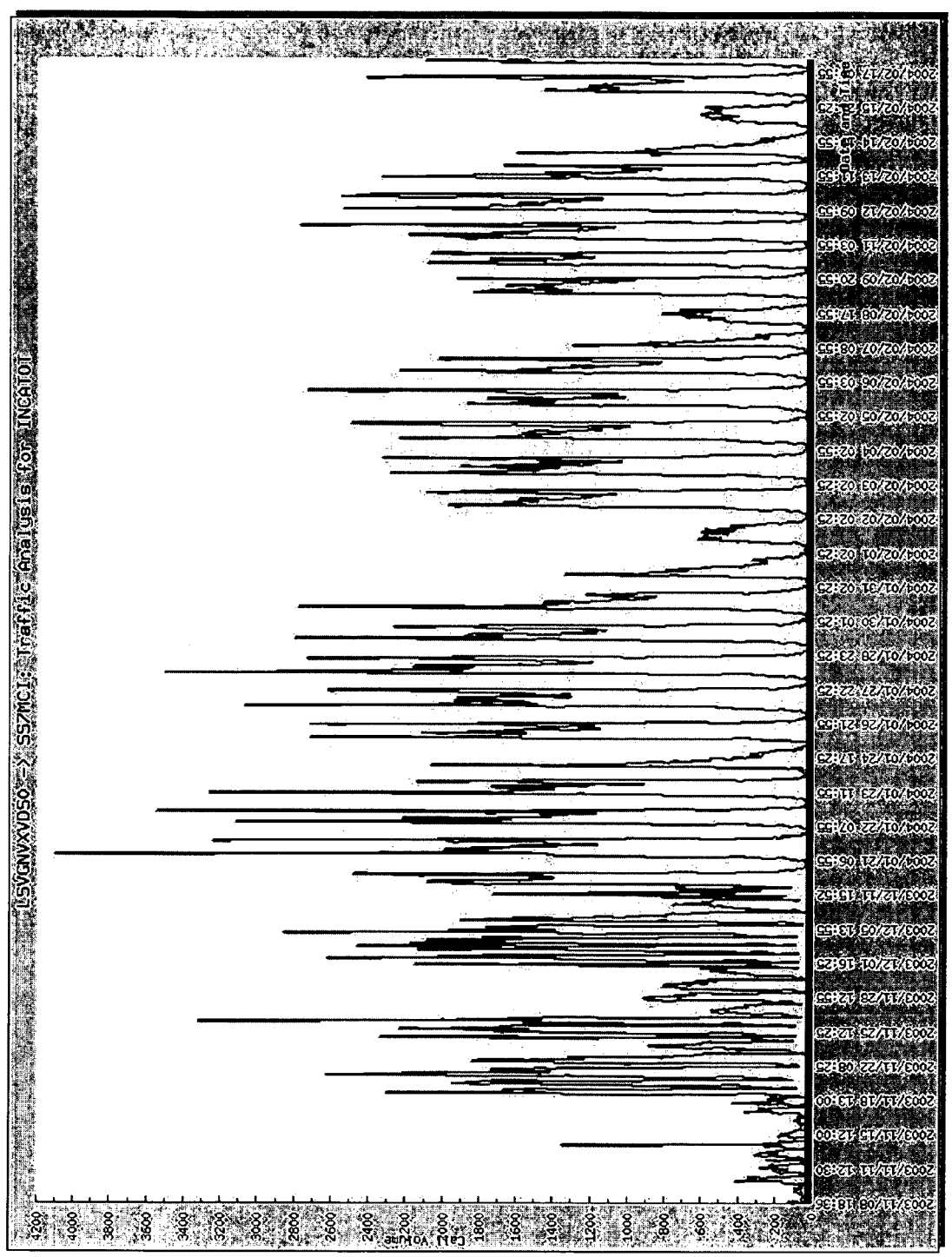
Figure 6E:
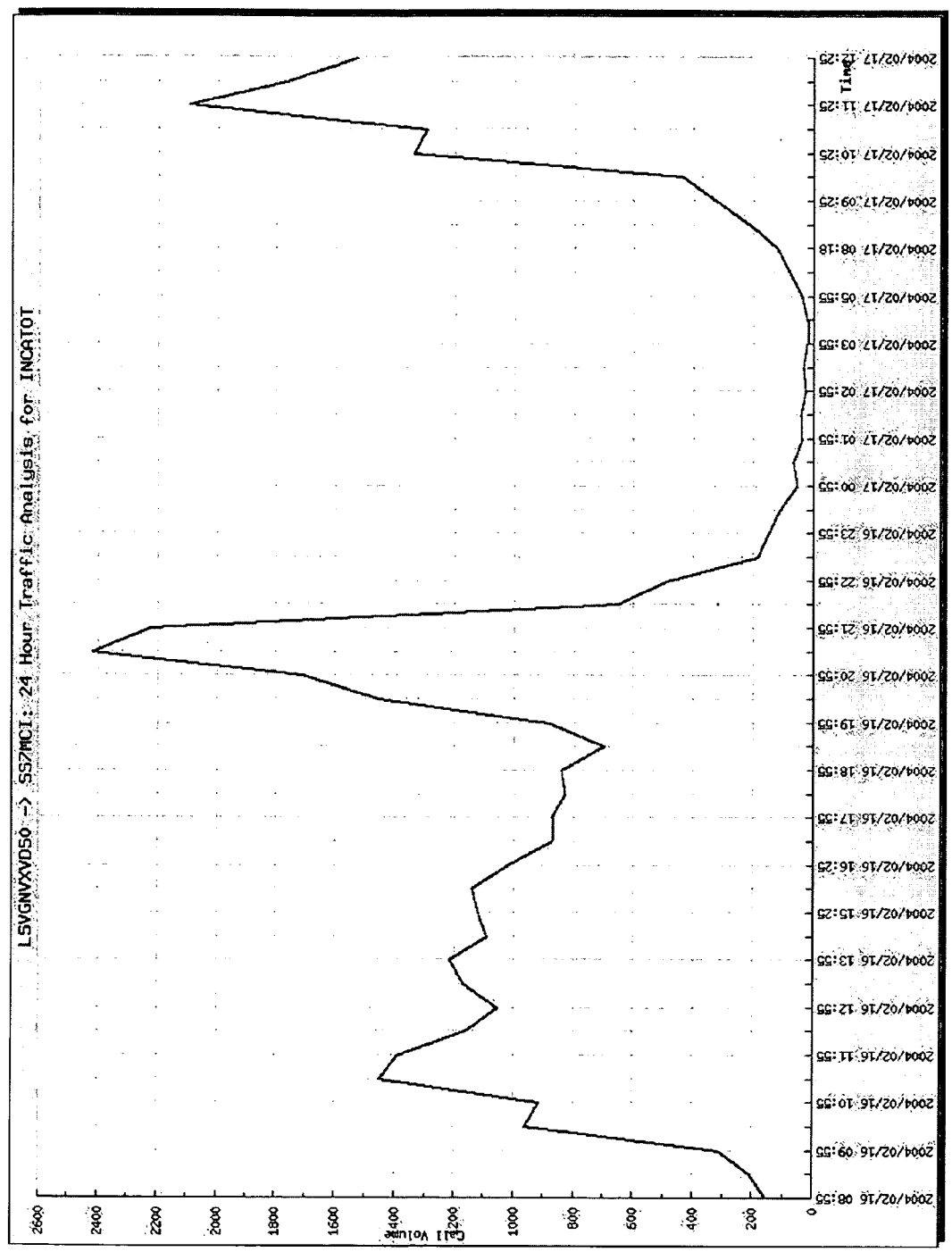
Figure 6F:
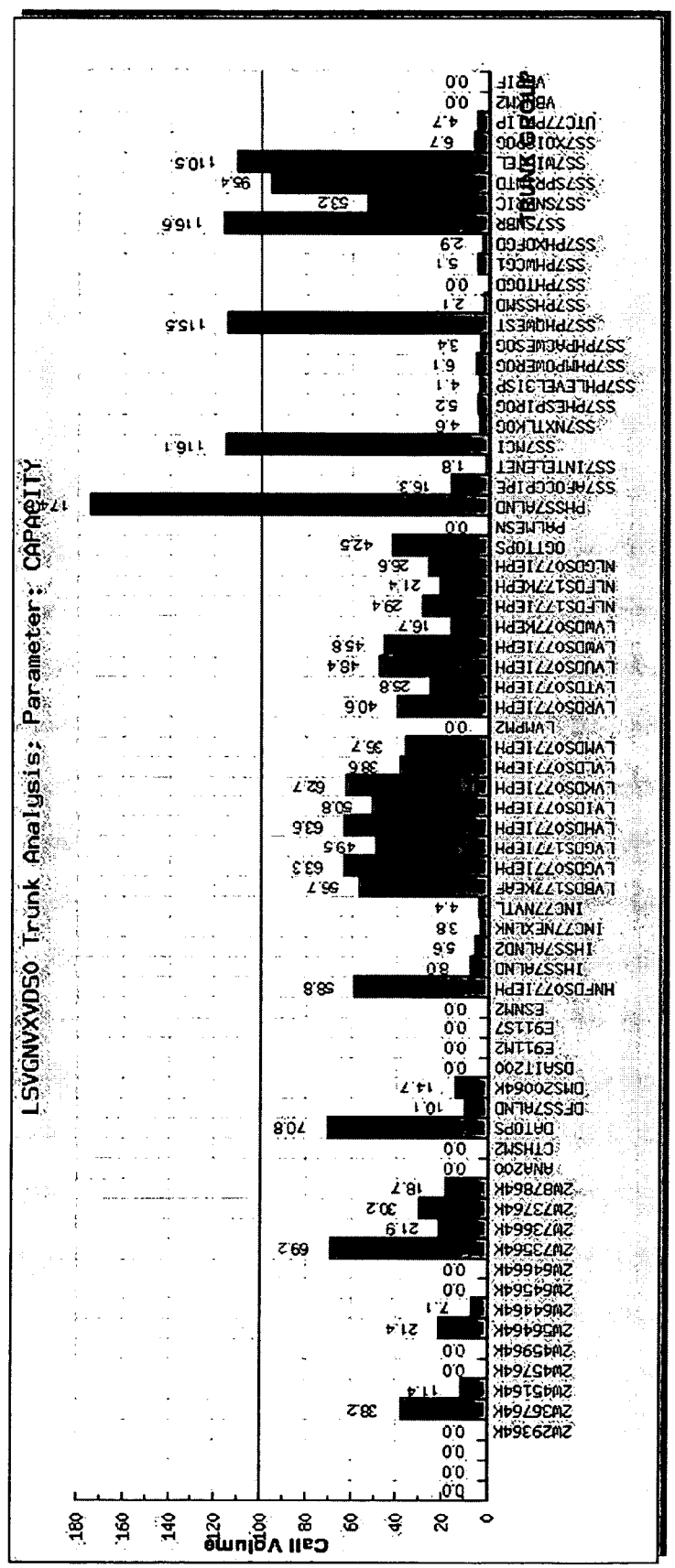

First traffic analyzer 514 is preferably a PHP file, and accepts a trunk-group name and a graph type as parameters to return a line graph report for the last 24 hours. Other types of graphs could be returned for various durations. For instance, second traffic analyzer 516 accepts a trunk-group name and a graph type as parameters and returns a comprehensive line graph report of the instant data. Bar-graph-generation module 518 returns an image of a bar graph for preferably all the trunks during a given run for a given parameter. Line-graph-generation module 520 returns an image of a comprehensive line graph for a given trunk group for a given parameter. An exemplary line graph generated by module 520 is depicted in FIG. 6D. Comprehensive-graph-generation module 522 returns an image of a line graph for a given trunk group for a given parameter over the last 24 hours. An exemplary comprehensive graph generated from 24-hour historical data is provided in FIG. 6E. Additional graphs, such as pie charts, scatter plots, area diagrams, etc. could also be generated using the appropriate modules. An exemplary Object Oriented Graphing Library 524 includes "JPGraph," which can be downloaded from http://www.aditus.nu/jpgraph/. FIG. 6F is a column chart representing data capacity that was produced by graphing module 124.

As can be seen, the present invention and its equivalents are well adapted to providing a method and system for archiving transient data in network elements and making such data readily available. Many different arrangements of the various components depicted, as well as components not shown, are possible without departing from the spirit and scope of the present invention. Those skilled in the art will appreciate the litany of additional network components that can be used in connection with the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. For example, instead of using mere spacing to organize the data of output file 134, delimiters can be used. Thus, commas, asterisks, or other characters can be placed after each datum. The delimiters can help importing output file 134 into other programs, although the output file as shown can be easily imported as well. Still further, application 112 can query multiple switches automatically and gather the data in a single output file or multiple files. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. A method for preserving transient data of a telecommunications switch, the method comprising:
   increasing the size of a communications buffer that is associated with establishing a communications link with the switch to a predetermined buffer size, the communications buffer being a buffer associated with logic to establish a telnet session;
   establishing the communications link with the switch;
   without user intervention, executing in batch a plurality of data-request commands, including referencing a first file that includes the plurality of data-request commands, the data-request commands including commands to retrieve operational-measurement data from the switch;
   receiving a plurality of information sets in response to the plurality of the data-request commands; and
   automatically parsing the plurality of information sets to produce an output file, the output file including at least a portion of data from the plurality of information sets, the portion of data being arranged in a format that includes a plurality of rows that respectively correspond to the portions of data, wherein automatically parsing the data sets includes:
      identifying a first pattern of data within one of the data sets;
      retrieving a data value based on the pattern;
      iteratively identifying successive patterns of data within the data sets;
      iteratively retrieving respective data values based on the pattern; and
      communicating the data values to the output file.

2. The method of claim 1, wherein the predetermined buffer size is set according to the number of data-request commands.

3. The method of claim 1, wherein the operational-measurement data include one or more selections from the following:
   usage data related to one or more trunk groups;
   a count of incoming calls;
   a indication of call volume;
   an indicating of data capacity;
   a count of incoming-call attempts;
   a count of call overflows;
   a count of glare instances;
   a count of trunks operating;
   a count of incoming call failures;
   a count of outbound failures; and
   traffic-flow metrics.

4. One or more computer-readable media having computer program instructions embodied thereon that, when executed by a processor, cause the processor to:
   establish a communications link with a network element;
   reference an input file that includes a plurality of data-request commands;
   automatically execute the plurality of data-request commands at the network element;
   generate an intermediary file that includes raw data returned incident to automatically executing the plurality of data-request commands; and
   without user intervention:
      parse the raw data, wherein parsing the raw data causes the processor to:
         identify a first pattern of data within the raw data;
         retrieve a data value based on the pattern;
         iteratively identify successive patterns of data within the raw data;
         iteratively retrieve respective data values based on the pattern; and
         communicate the data values to the output file; and
      generate an immediately accessible output file that includes all or a portion of the raw data in a prescribed format, the prescribed format including a plurality of rows that respectively correspond to the all or portion of the raw data.

5. The media of claim 4, wherein the computer program instructions that cause the processor to establish a communications link with a network element further cause the processor to modify the size of a communications buffer to a size that will prevent overflows when receiving data from said network element.

6. The media of claim 5, wherein said size of said communications buffer is proportional to the number of said plurality of data-request commands.

7. The media of claim 6, wherein said size of said communications buffer is approximately 500 kb per data-request command.

8. The media of claim 5, wherein said data-request commands include operational-measurement commands.

9. The media of claim 8, wherein the computer program instructions further cause the processor to present said output file on an output device, including a display device or hard-copy device.

10. The media of claim 9, wherein the computer program instructions that cause the processor to present said output file further cause the processor to import said output file in a spreadsheet program.

11. The media of claim 9, wherein the computer program instructions that cause the processor to present said output file further cause the processor to present said raw data in a graphical format.

12. The media of claim 11, wherein the computer program instructions that cause the processor to present said output file further cause the processor to present said raw data in a Web-based format.

13. A computer-implemented method for troubleshooting a communications network, the method comprising:
   manipulating a size of a communications buffer that will be used to receive data from a network element;
   automatically retrieving transient data from the network element by issuing a plurality of data-request commands; and
   without user intervention, storing the transient data in a format having a plurality of rows, each of the plurality of rows corresponds to a data set returned from a respective data-request command, storing the transient data further includes:
      identifying a first pattern of data within the data set;
      retrieving a data value based on the pattern;
      iteratively identifying successive patterns of data within the data set;
      iteratively retrieving respective data values based on the pattern; and
      storing the data.

14. The method of claim 13, wherein manipulating a size of a communications buffer includes sizing said buffer according to the amount of transient data to be received from said network element.

15. The method of claim 14, wherein the data-request commands include commands to retrieve operational-measurement data.

* * * * *